(12) United States Patent
Majumdar

(10) Patent No.: US 11,687,817 B2
(45) Date of Patent: Jun. 27, 2023

(54) SYSTEM AND METHOD FOR PROVIDING DATA COMPUTATION VIA QUANTUM COMPUTERS

(71) Applicant: Cognizant Technology Solutions India Pvt. Ltd., Chennai (IN)

(72) Inventor: Ashish Majumdar, Kolkata (IN)

(73) Assignee: COGNIZANT TECHNOLOGY SOLUTIONS INDIA PVT. LTD., Chennai (IN)

( * ) Notice: Subject to any disclaimer, the term of this patent is extended or adjusted under 35 U.S.C. 154(b) by 169 days.

(21) Appl. No.: 17/096,380

(22) Filed: Nov. 12, 2020

(65) Prior Publication Data

US 2022/0101164 A1 Mar. 31, 2022

(30) Foreign Application Priority Data

Sep. 28, 2020 (IN) .............................. 202041041933

(51) Int. Cl.
*G06N 10/00* (2022.01)
*G06N 20/00* (2019.01)
*G06F 21/31* (2013.01)
*G06F 3/0482* (2013.01)

(52) U.S. Cl.
CPC ............. *G06N 10/00* (2019.01); *G06F 21/31* (2013.01); *G06N 20/00* (2019.01); *G06F 3/0482* (2013.01)

(58) Field of Classification Search
CPC ........ G06N 10/00; G06N 20/00; G06F 21/31; G06F 3/0482
See application file for complete search history.

(56) References Cited

U.S. PATENT DOCUMENTS

| | | | |
|---|---|---|---|
| 2018/0285300 A1* | 10/2018 | Prentice | G06F 13/1694 |
| 2018/0307988 A1 | 10/2018 | Fano | |
| 2019/0164034 A1* | 5/2019 | Gambetta | G06N 10/00 |
| 2020/0005154 A1* | 1/2020 | Herbster | G06T 9/002 |
| 2020/0027029 A1 | 1/2020 | Linvill | |
| 2020/0169396 A1* | 5/2020 | Neven | H04L 9/0852 |
| 2021/0097419 A1* | 4/2021 | Limberg | G06N 10/00 |
| 2021/0256414 A1* | 8/2021 | Kachman | G06V 10/75 |
| 2021/0334700 A1* | 10/2021 | Nagaraja | G06N 20/00 |

* cited by examiner

*Primary Examiner* — Beau D Spratt
(74) *Attorney, Agent, or Firm* — Cantor Colburn LLP

(57) ABSTRACT

A system and a method for providing data computation using quantum computing is disclosed. In particular, the present invention enables client computing devices to readily access quantum computers and perform complex computational tasks using quantum computing. In operation, a computational problem is defined based on one or more inputs received from the client device. The one or more inputs include an objective, and one or more parameters associated with the objective. Further, a category associated with the computational problem is identified. Furthermore, one or more predefined machine learning codes are determined based on the identified category of the computational problem. Finally, the computational problem is encoded into a format interpretable by the quantum computers, and processed by the quantum computers based on the selected one or more machine learning codes to obtain an optimal solution to the computational problem.

21 Claims, 4 Drawing Sheets

SYSTEM AND METHOD FOR PROVIDING DATA COMPUTATION VIA QUANTUM COMPUTERS

CROSS REFERENCE TO RELATED APPLICATION

This application is related to and claims the benefit of Indian Patent Application Number 202041041933 filed on Sep. 28, 2020, the contents of which are herein incorporated by reference in their entirety.

FIELD OF THE INVENTION

The present invention relates generally to the field of data processing and quantum computing. More particularly, the present invention relates to a system and a method which facilitates data computation using quantum computing by providing ready access to quantum computers, and formatting computation requests in a format interpretable by the quantum computers.

BACKGROUND OF THE INVENTION

The demand for data processing is ever-increasing. Every sector from manufacturing to entertainment is implementing complex tools such as artificial intelligence and machine learning powered cognitive assistance for enhancing the end-product quality as well as quantity, which further requires advanced data processing. An application of machine learning in the manufacturing industry may be seen in the form of self-learning robots in the production line. An application of machine learning powered cognitive assistants may be readily observed in supply chain optimization, where planning systems allocate products and materials as per rapidly changing priorities from the consumers. However, with ever-increasing demand for data processing, the demand for higher computing power is also increasing. In order to fulfil the aforementioned computing requirements most of the sectors have migrated to faster and smarter systems with higher computation power. However, it has been observed that said systems fail to handle enormous volumes of real-time complex data coming in at high frequencies and with a high degree of variability. Further, the processing time required by said system is high.

As a result, some sectors are migrating to quantum computers which use quantum-mechanical phenomena, such as superposition and entanglement, to perform operations on data. Quantum computers are advanced and expensive, therefore, many third party service providers are offering shared quantum computing resources over cloud. However, configuring and accessing a quantum computer requires writing of one or more of codes(s) and scripts. Further, the use of quantum computers to perform a desired computational task requires writing of one or more codes and scripts which again requires manual effort and technical expertise. The writing and implementation of codes and scripts is labor intensive, incurs costs, and is prone to errors, often resulting in high rework and maintenance efforts. Furthermore, the time required to write the codes and scripts may be equal to or may exceed the time required by the quantum computer to process the computation request. Yet further, the existing quantum computers require one or more user(s) to have technical expertise in the field of quantum computing and coding to write, edit and execute code and scripts, which in turn restricts a non-technical user to access and use quantum computers.

In light of the above drawbacks, there is a need for a system and method which provides ready access to quantum computers for data computation using quantum computing. There is a need for a system and method which provides automated formatting of data computation requests in a format interpretable by the quantum computers. Further, there is a need for a system and a method which eliminates the need for a user to have any technical expertise on quantum computing. Furthermore, there is a need for a system and a method that can be accessed remotely for performing quantum computing. Yet further, there is a need for a system and a method which can effectively and efficiently perform complex computational tasks. Yet further, there is a need for a system and a method which maximizes success rate of providing an optimal solution for the computational task. Yet further, there is a need for a system and a method which is inexpensive and can be easily integrated with any standard Enterprise Resource Planning (ERP) framework or an advanced planning system.

SUMMARY OF THE INVENTION

In various embodiments of the present invention, a method for providing data computation via a quantum computer to a client computing device is disclosed. The method is implemented by at least one processor executing program instructions stored in a memory. The method comprises defining a computational problem based on an input request received from the client computing device. The method further comprises determining one or more predefined machine learning codes for processing the computational problem. Further, the method comprises evaluating an optimal solution to the computational problem using the quantum computer. The evaluating of the optimal solution comprises encoding the computational problem into a format interpretable by the quantum computer, and processing using the quantum computer based on the one or more predefined machine learning codes. Furthermore, the method comprises converting the optimal solution into a format interpretable by the client computing device.

In various embodiments of the present invention, a system for providing data computation is disclosed. The system interfaces with a client computing device and a quantum computer. The system comprises a memory storing program instructions, a processor configured to execute program instructions stored in the memory, and a quantum computation engine executed by the processor. The system is configured to define a computational problem based on an input request received from the client computing device. Further, the system is configured to determine one or more predefined machine learning codes for processing the computational problem. Furthermore, the system is configured to evaluate an optimal solution to the computational problem using the quantum computer, where evaluating the optimal solution comprises encoding the computational problem into a format interpretable by the quantum computer, and processing using the quantum computer based on the one or more predefined machine learning codes. Yet further, the system is configured to convert the optimal solution into a format interpretable by the client computing device.

In various embodiments of the present invention, a computer program product is provided. The computer program product comprises a non-transitory computer-readable medium having computer-readable program code stored thereon, the computer-readable program code comprising instructions that when executed by a processor, cause the processor to define a computational problem based on an input request received from a client computing device. Further, one or more predefined machine learning codes are determined for processing the computational problem. Furthermore, an optimal solution to the computational problem is evaluated using a quantum computer. The evaluating of the optimal solution comprises encoding the computational problem into a format interpretable by the quantum computer, and processing using the quantum computer based on the one or more predefined machine learning codes. Yet further, the optimal solution is converted into a format interpretable by the client computing device.

BRIEF DESCRIPTION OF THE ACCOMPANYING DRAWINGS

The present invention is described by way of embodiments illustrated in the accompanying drawings wherein.

DETAILED DESCRIPTION OF THE INVENTION

Figure 1:
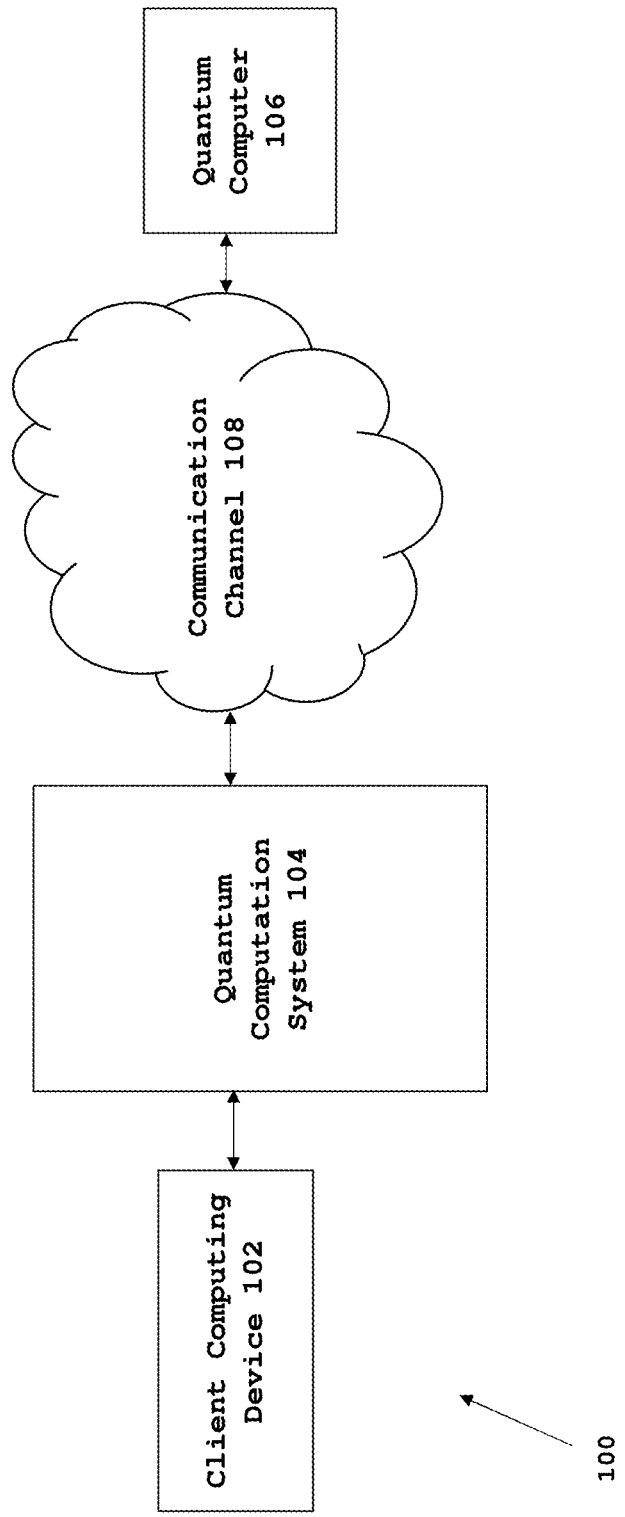
FIG. 1 is a block diagram of a computing environment including a system for providing data computation using quantum computing, in accordance with various embodiments of the present invention.

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purposes of clarity, details relating to technical material that is known in the technical fields related to the invention have been briefly described or omitted so as not to unnecessarily obscure the present invention. The term computational problem as used in the specification refers to a task of finding a best solution to a computational problem from all feasible solutions to the problem. The term optimal solution as used in the specification refers to the best solution to the computational problem.

The present invention discloses a system and a method for providing data computation using quantum computing. In particular, the present invention discloses a system and a method that provides ready access to quantum computers and performs complex computational tasks with high precision in shorter time duration using quantum computing. The present invention may be utilized in a variety of applications where complex computation is required in real time, such as solving computational problems having a plurality of solutions ranging from thousands to quintillions.

The various categories of computational problems may include, but are not limited to, supply chain optimization problems, warehouse management, delivery routing, traffic routing, weather forecasting, engineering design problems, network load balancing, processor load balancing and cellular antenna load balancing, etc. In operation, the present invention provides for defining a computational problem based on one or more inputs received from a user. The one or more inputs include an objective, and one or more parameters associated with the objective. Further, the present invention provides for identification of a category associated with the computational problem. Furthermore, the present invention provides for determination of one or more predefined machine learning codes based on the identified category of the computational problem. Finally, the present invention provides for converting the computational problem in a format interpretable by the quantum computers, and processing the computational problem based on the selected one or more machine learning codes using the quantum computers to obtain an optimal solution to the computational problem.

The present invention would now be discussed in context of embodiments as illustrated in the accompanying drawings.

Referring to FIG. 1 a block diagram of a computing environment including a system for providing data computation using quantum computing is illustrated. In various embodiments of the present invention, the computing environment 100 includes a client computing device 102, a system for providing data computation using quantum computing herein after referred to as quantum computation system 104, and a quantum computer 106.

In accordance with various embodiment of the present invention, the client computing device 102 may be a general purpose computer such as desktop, notebook, smartphone and tablets; a super computer; a microcomputer or any device capable executing instructions, connecting to a network and performing computation. In an embodiment of the present invention, client computing device 102 is configured with an Enterprise resource planning (ERP) or an Advanced planning and optimization system including, but not limited to, Supply Network Planning (SNP), Demand Planning (DP), Production planning and detail scheduling (PPD), and Global available to promise (GATP). The client computing device 102 is configured to interface with the quantum computation system 104 to input queries and obtain computed results.

In accordance with various embodiments of the present invention, the quantum computation system 104 may be a software or a combination of software and hardware. In an embodiment of the present invention as shown in FIG. 1, the quantum computation system 104 is a combination of software and hardware. In an embodiment of the present invention, the quantum computation system 104 may be implemented as a client-server architecture, wherein the client computing device 102 accesses a server hosting the quantum computation system 104 over a first communication channel (not shown). Examples of the first communication channel may include, but are not limited to, an interface such as a software interface, a physical transmission medium such as a wire, or a logical connection over a multiplexed medium such as a radio channel in telecommunications and computer networking. Examples of radio channel in telecommunications and computer networking may include, but are not limited to, a Local Area Network (LAN), a Metropolitan Area Network (MAN), and a Wide Area Network (WAN).

In another embodiment of the present invention, the quantum computation system 104 may be implemented in a cloud computing architecture in which data, applications, services, and other resources are stored and delivered through shared data-centers. In an exemplary embodiment of the present invention, the functionalities of the quantum computation system 104 are delivered as Software as a Service (SAAS) to the client computing device 102. In an exemplary embodiment of the present invention, the quantum computation system 104 may be installed on to the client computing device 102. The quantum computation system 104 provides a graphical user interface for receiving inputs and outputting results onto the client computing device 102.

In various embodiments of the present invention, the quantum computation system 104 is configured to interface with the quantum computer 106 to process the input received from the client computing device 102. The quantum computation system 104 interfaces with the quantum computers 106 over a second communication channel 108. Examples of the second communication channel 108 may include, but are not limited to, an interface such as a software interface, a physical transmission medium such as a wire, or a logical connection over a multiplexed medium such as a radio channel in telecommunications and computer networking. Examples of radio channel in telecommunications and computer networking may include, but are not limited to, a Local Area Network (LAN), a Metropolitan Area Network (MAN), and a Wide Area Network (WAN). The configuration and working of the quantum computation system 104 is explained in detail later in the specification with reference to FIG. 1A.

In various embodiments of the present invention, the quantum computer 106 is any computer configured to use quantum-mechanical phenomena, such as superposition and entanglement, to perform operations on data. Examples of quantum computers include, but are not limited to, adiabatic quantum computers, quantum gate arrays, one-way quantum computer, topological quantum computers, quantum Turing machines, superconductor-based quantum computers, trapped ion quantum computers, optical lattices, quantum dot computers, spin-based quantum computers, spatial-based quantum computers, nuclear magnetic resonance (NMR) based quantum computers, liquid-NMR quantum computers, solid state NMR Kane quantum computers, electrons-on-helium quantum computers, transistor-based quantum computers, or any other type of quantum computer.

In an embodiment of the present invention as shown in FIG. 1, the quantum computer 106 is a remote resource implemented over the cloud and accessible for shared usage in a distributed computing architecture. In an exemplary embodiment of the present invention, the quantum computer 106 may be a cloud quantum computing resource offered by third party vendors such as DWave, IBM, Amazon, and Microsoft etc. In another embodiment of the present invention, the quantum computer 106 may be hosted in the premises of the quantum computation system 104 provider. In an exemplary embodiment of the present invention, the examples of the staging servers for hosting the quantum computer 106 may include, but are not limited to, IBM eServer xSeries 450, HP Itanium 2 Systems and Dell's PowerEdge 3250.

Figure 1A:
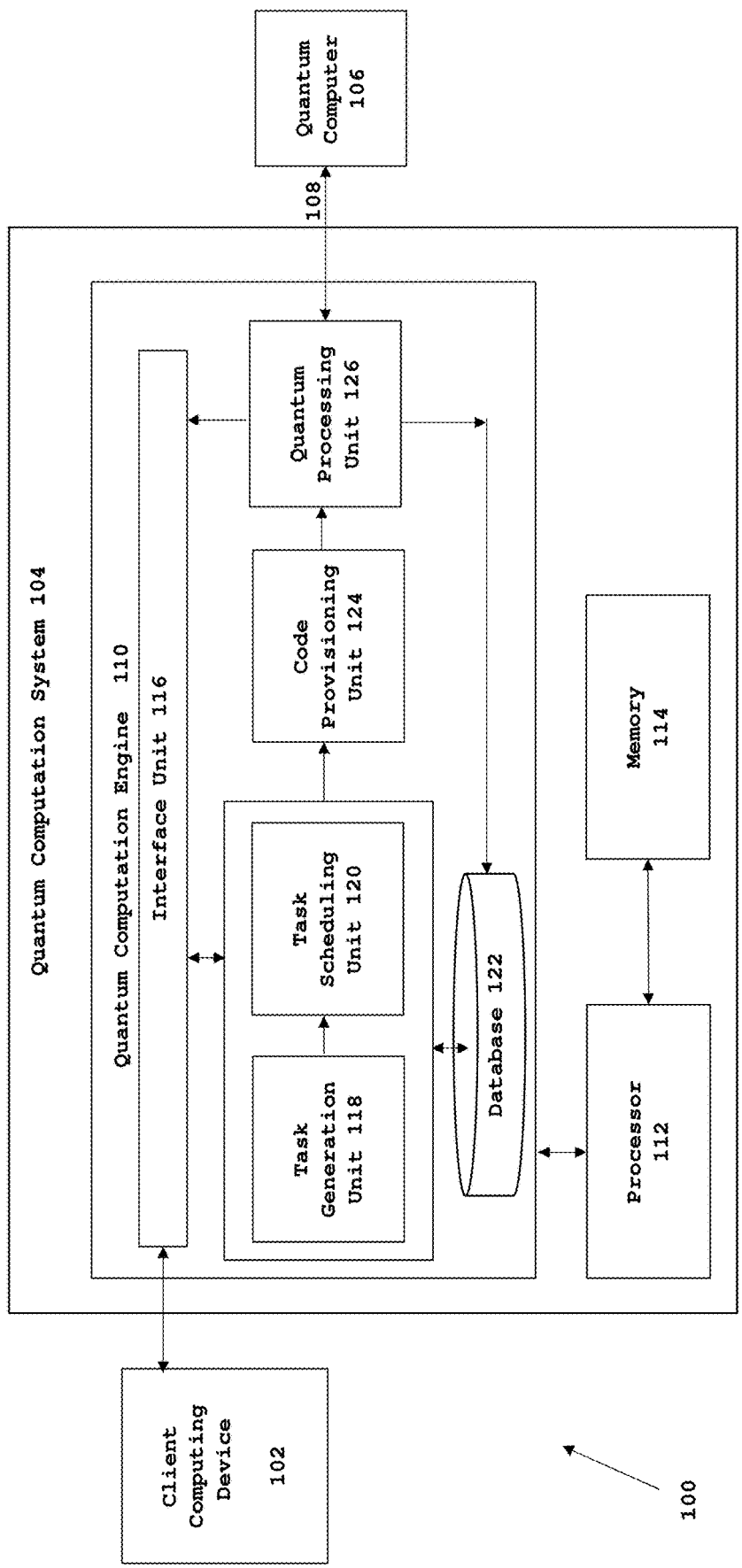
FIG. 1A illustrates a detailed block diagram of a system for providing data computation using quantum computing, in accordance with various embodiments of the present invention.

Referring to FIG. 1A, a detailed block diagram of the quantum computation system 104 is illustrated, in accordance with various embodiments of the present invention. The quantum computation system 104 comprises a quantum computation engine 110, a processor 112 and a memory 114.

The quantum computation engine 110 is operated via the processor 112 specifically programmed to execute instructions stored in the memory 114 for executing functionalities of the system 104 in accordance with various embodiments of the present invention. In an embodiment of the present invention, the memory 114 may be divided into a Random Access Memory (RAM), a Read-only memory (ROM) and hard drive disk (HDD). In an exemplary embodiment of the present invention, the HDD has a storage of 300-1000 GB and the RAM has 16 GB capacity.

In accordance with various embodiments of the present invention, the quantum computation engine 110 is a self-learning engine configured to receive input queries, define computational problems understandable by quantum computers, categorize computational problems, schedule processing of the computational problems, determine appropriate machine learning codes for processing respective computational problems, and outputting optimal solutions.

In accordance with various embodiments of the present invention, the quantum computation engine 110 comprises an interface unit 116, a task generation unit 118, a task scheduling unit 120, a database 122, a code provisioning unit 124, and a quantum processing unit 126. The various units of the quantum computation engine 110 are operated via the processor 112 specifically programmed to execute instructions stored in the memory 114 for executing respective functionalities of the multiple units in accordance with various embodiments of the present invention.

In various embodiments of the present invention, the interface unit 116 is configured to facilitate communication with the client computing device 102 and external system resources (not shown) associated with the client computing device 102. In an exemplary embodiment of the present invention, where the quantum computing system 104 is configured for supply chain optimization, the external system resources may include, but are not limited to, supply chain vendors, 3D printers, material vendors, third party manufacturers, delivery vendors, outsourced warehouses etc. In an embodiment of the present invention, the interface unit 116 is configured to interface with the client computing device 102 and external system resources (not shown) using a software interface. In an exemplary embodiment of the present invention, the interface unit 116 is configured with an API module to facilitate smooth interfacing with external system resources (not shown). The API module is configured with one or more application programming interfaces (APIs) such as REST and SOAP APIs.

In an embodiment of the present invention, the interface unit 116 includes a graphical user interface (not shown) accessible on the client computing device 102 to facilitate user interaction. In an exemplary embodiment of the present invention, the graphical user interface allows a user to create login credentials, generate tokens for accessing quantum computer 106, input queries or requests for execution, implement workflows, access other services such as email, SMS and internet service configuration, access logs, and access external system resources(not shown) among things. In an embodiment of the present invention, the graphical user interface associated with the interface unit 116 may be accessed from the client computing device 102 through an IP address. In another embodiment of the present invention, the interface unit 116 is accessible by the client computing device 102 via a software module installable on client computing device 102. In an exemplary embodiment of the present invention, the software module is capable of integration with the ERP or APS systems configured in the client computing device.

In various embodiments of the present invention, the interface unit 116 is configured to receive requests associated with a computational problem from the client computing device 102. In an exemplary embodiment of the present invention, each request includes an objective, and one or more parameters associated with the objective. For instance, in case of a request associated with supply chain optimization, the objective may be to identify the fastest route to manufacture a customizable good, and the one or more parameters may include, but are not limited to, location of the order, customization details such as color or material, associated vendors for materials, delivery date and time. Similarly, in case of a request associated with warehouse planning, the objective may be to identify high, low and medium selling goods for a particular season, and the one or more parameters may include, but are not limited to, warehouse location, season name, product preference, etc. It is to be understood that the one or more parameters may vary based on the objective.

In operation, a user of the client computing device 102 logins to the quantum computation system 104 using a set of generated credentials. In an embodiment of the present invention, the interface unit 116 is configured to authenticate user-access to use the functionalities of the quantum computation system 104. In an embodiment of the present invention, the interface unit 116 is configured to authenticate user-access using one or more authentication techniques selected from a custom based authentication and a Single sign-on (SSO) based authentication. In an exemplary embodiment of the present invention, the custom based authentication, may include, but is not limited to, implementing a JSON Web Token (JWT) authentication for authenticating the individual users and users of a specific group. Further, the generated access token is passed with every user request to validate and secure user's data. The SSO based authentication may include, but is not limited to the implementation of LDAP authentication mechanism to authenticate users. Subsequent to the user authentication, the interface unit 116 provides access to functionalities of the quantum computation system 104. In particular, the interface unit 116 provides access to input data for processing by the system 104 via the graphical user interface among other things, such as, selecting previously executed logs, implementing workflows, accessing other services such as email, SMS and internet service configuration, and access external system resources(not shown). In an embodiment of the present invention, the interface unit 116 is configured to provide a dropdown menu for selection of predefined parameters based on the objective associated with the request.

In various embodiments of the present invention, the task generation unit 118 is configured to receive inputted requests from the interface unit 116. In various embodiments of the present invention, the task generation unit 118 is configured to define a computational problem based on the input request received from a user. In operation, the task generation unit 118 defines a computational problem based on the objective and the one or more parameters included in the received request. In an exemplary embodiment of the present invention, the task generation unit 118 defines the computational problem using a logical unit of work (LUW). The LUW may be dynamically generated for each request. In an exemplary embodiment of the present invention, each objective may have respective LUW. In an embodiment of the present invention, the task generation unit 118 is configured to maintain the defined computational problem in the database 122. In an exemplary embodiment of the present invention, the database 122 is a local database. In other embodiments of the present invention, the database 122 may be an external database which may be accessed locally or remotely.

In an embodiment of the present invention, the task scheduling unit 120 is configured to receive the computational problem associated with the input request from the task generation unit 118. The task scheduling unit 120 is configured to schedule the execution of the computational problem. In an embodiment of the present invention, the computational problem may be selected for immediate execution or execution at a later duration. Further, the task scheduling unit 120 may be configured to schedule the computational problem for repeated processing after a fixed duration of time. The task scheduling unit 120 is configured to maintain the processing schedule in the database 122. In various embodiments of the present invention, the task scheduling unit 120 is configured to maintain a queue for feeding the computational problems for processing based on the time stamp of the incoming requests.

In various embodiments of the present invention, the code provisioning unit 124 is configured to receive the computational problem from task scheduling unit 120. In various embodiments of the present invention, the code provisioning unit 124 is configured to identify a category associated with the computational problem. The various categories of computational problems may include, but are not limited to, supply chain optimization problems, warehouse management, delivery routing, traffic routing, weather forecasting, engineering design problems, network load balancing, processor load balancing and cellular antenna load balancing, etc. In an embodiment of the present invention, the code provisioning unit 124 is configured to identify the category of the computational problem based on the input request data including objective and the one or more parameters using data analytics.

In various embodiments of the present invention, the code provisioning unit 124 is configured to determine one or more predefined machine learning codes for processing the scheduled computational problem. In an embodiment of the present invention, the code provisioning unit 124 is configured to determine the one or more predefined machine learning codes based on the identified category of the computational problem. In an embodiment of the present invention, the code provisioning unit 124 comprises a code collection module comprising a plurality of predefined machine learning codes for processing respective categories of computational problems. In an exemplary embodiment of the present invention the machine learning codes are defined in a format interpretable by the quantum computer 106.

In various embodiments of the present invention, the quantum processing unit 126 is configured to evaluate an optimal solution to the computational problem by processing said computational problem using quantum computing. In particular, the quantum processing unit 126 is configured to process the computational problem based on the determined one or more machine learning codes using the quantum computer 106. In operation, the quantum processing unit 126 is configured to encode the scheduled computational problem into a format interpretable by the quantum computer 106. In an embodiment of the present invention, the quantum processing unit 126 uses one or more quantum algorithms for transforming the classical data of the computational problem into quantum states interpretable by the quantum computer 106. Further, the encoded computational problem and the selected one or more machine learning codes are fed into the quantum computer 106 for processing and an optimal solution is evaluated. In an embodiment of the present invention, the quantum processing unit 126 establishes a connection with the quantum computer 106 using a unique token provided to the respective users of the client computing device 102 via one or more APIs. In an exemplary embodiment of the present invention, where the quantum computer is hosted by a third party, the computational problem and the selected one or more machine learning codes are converted into the format defined by the third party host.

In various embodiments of the present invention, the quantum processing unit 126 is configured to receive an output from the quantum computer 106. The output is representative of an optimal solution to the computational problem. Further, the quantum processing unit 126 is configured to encode the received output into a format interpretable by the client computing device 102. In an exemplary embodiment of the present invention, the output is converted into a classical data format. The quantum processing unit 126 is configured to transmit the obtained output to the client computing device via the interface unit 116.

Further, the quantum processing unit 126 is configured to maintain logs associated with the processed computational problem in the database 122. Each log may include at least the details associated with the request, computational problem, the machine learning code used, and the solution to the computational problem.

Advantageously, the system of the present invention provides ready access to quantum computers for data computation, and automatically formats data computation requests in a format interpretable by the quantum computers. The system of the present invention eliminates the need for a user to have any technical expertise on quantum computing, and acts as a middle ware to provide ready access to quantum computers. Further, the system of the present invention provides ready access to quantum computing and performs complex computational tasks with high precision in shorter time duration using the quantum computers. Furthermore, the system of the present invention can be easily integrated with any standard Enterprise Resource Planning (ERP) framework or an advanced planning system, and enables a user to access quantum computers without writing any codes. Yet further, the system of the present invention enables real-time processing of complex computational problems to obtain optimal solutions.

Figure 2:
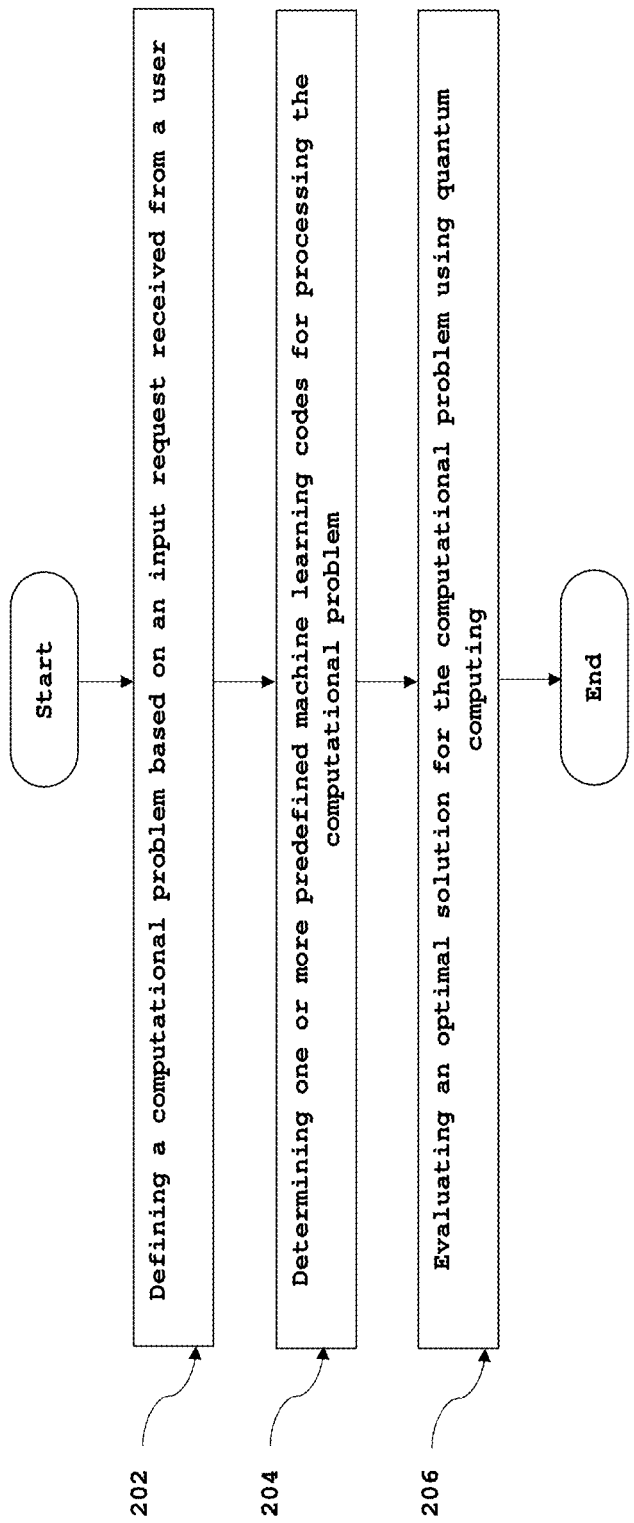
FIG. 2 is a flowchart illustrating a method for providing data computation via quantum computers, in accordance with various embodiments of the present invention.

FIG. 2 is a flowchart illustrating a method for providing data computation via quantum computers, in accordance with various embodiments of the present invention.

Referring to FIG. 2, at step 202, a computational problem is defined based on an input request received from a user. In an exemplary embodiment of the present invention, each request includes an objective, and one or more parameters associated with the objective. For instance, in a case of a request associated with supply chain optimization, the objective may be to identify the fastest route to manufacture a customizable good, and the one or more parameters may include, but are not limited to, location of the order, customization details such as color or material, associated vendors for materials, delivery date and time. Similarly, in case of a request associated with warehouse planning, the objective may be to identify high, low and medium selling goods for a particular season, and the one or more parameters may include, but are not limited to, warehouse location, season name, product preference, etc. It is to be understood that the one or more parameters may vary based on the objective.

In operation, a user may input the request associated with the computational problem via a client computing device 102 of FIG. 1. In an exemplary embodiment of the present invention, the user may be authenticated prior to receiving input requests. In an embodiment of the present invention, a dropdown menu is enabled on successful authentication for receiving the objective associated with the request and selecting predefined one or more parameters based on the objective. In an exemplary embodiment of the present invention, the contents of the drop down menu may be dependent on the user role and user rights. Further, the computational problem is defined based on the objective and the one or more parameters included in the received request. In an exemplary embodiment of the present invention, the computational problem is defined using a logical unit of work (LUW). In an exemplary embodiment of the present invention, each objective may have respective LUW dynamically generated and maintained in a database. In an embodiment of the present invention, the defined computational problem may be stored and maintained in the database along with the LUW applied. The computational problem may be assigned a hexadecimal code for tracking the execution and logs in future.

In an embodiment of the present invention, the computational problem is schedulable for immediate execution, or execution at a later duration using a scheduling technique. Further, the computational problem may be scheduled for repeated execution after a fixed duration of time. In an embodiment of the present invention, the execution schedule of the computational problem may be stored in the database.

At step 204, one or more predefined machine learning codes are determined for processing the scheduled computational problem. In an embodiment of the present invention, the one or more predefined machine learning codes are determined based on an identification of a category of the computational problem. In an embodiment of the present invention, a category associated with the computational problem is identified based on the input request including objective and the one or more parameters using data analytics. The various categories of computational problems may include, but are not limited to, supply chain optimization problems, warehouse management, delivery routing, traffic routing, weather forecasting, engineering design problems, network load balancing, processor load balancing and cellular antenna load balancing, etc. In an exemplary embodiment of the present invention, the machine learning codes may be defined in a format interpretable by a quantum computer.

At step 206, an optimal solution to the computational problem is evaluated. In an embodiment of the present invention, an optimal solution is evaluated by processing said computational problem using a quantum computer. In particular, the computational problem is processed using the quantum computer 106 of FIG. 1 based on the determined one or more machine learning codes. In operation, the scheduled computational problem is encoded to transform the computational problem into a format interpretable by the quantum computer 106 of FIG. 1 using one or more encoding techniques. In an embodiment of the present invention, one or more algorithms are used for transforming the classical data of the computational problem into quantum states interpretable by the quantum computer 106 of FIG. 1. Further, the encoded computational problem and the selected one or more machine learning codes are fed into the quantum computer 106 for processing, and an optimal solution is evaluated. In an embodiment of the present invention, a connection is established with the quantum computer 106 via one or more APIs using a token generation technique, where a unique token is provided to the respective user of the client computing device 102 of FIG. 1. In an exemplary embodiment of the present invention, where the quantum computer is hosted by a third party, the computational problem and the selected one or more machine learning codes are encoded into the format defined by the third party host.

Further, an output is received from the quantum computer 106. The output is representative of an optimal solution to the computational problem. The output is transformed into a format interpretable by the client computing device 102. In an exemplary embodiment of the present invention, the output is converted into a classical data format. The obtained output is transmitted to the client computing device 102. Further, the logs associated with the processed computational problem are maintained in the database. The database may be an external database or an internal database. In an exemplary embodiment of the present invention, each log may include at least the details associated with the request, computational problem, the machine learning code used, and the solution to the computational problem.

Figure 3:
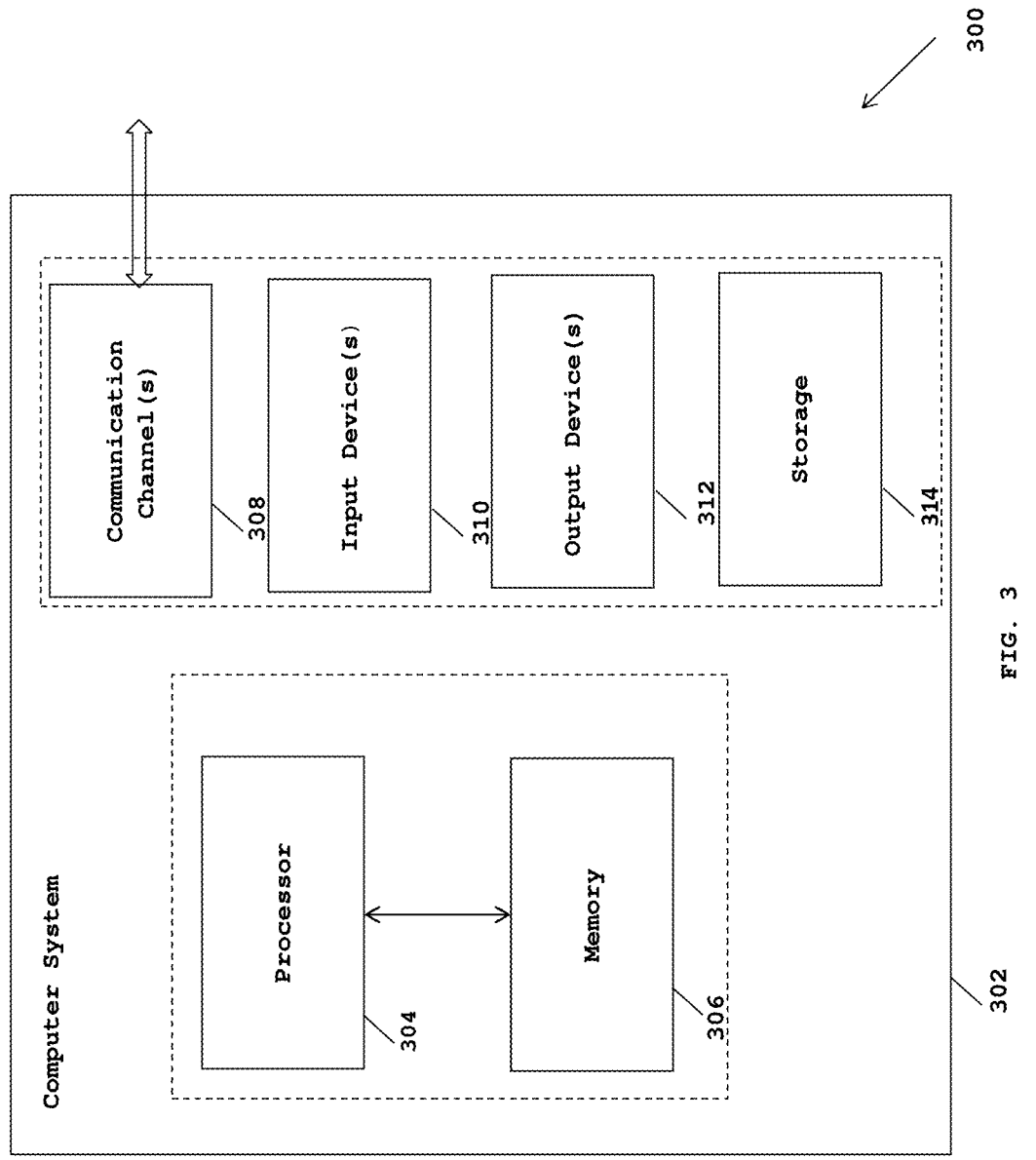
FIG. 3 illustrates an exemplary computer system in which various embodiments of the present invention may be implemented.

FIG. 3 illustrates an exemplary computer system in which various embodiments of the present invention may be implemented.

The computer system 302 comprises a processor 304 and a memory 306. The processor 304 executes program instructions and is a real processor. The computer system 302 is not intended to suggest any limitation as to scope of use or functionality of described embodiments. For example, the computer system 302 may include, but not limited to, a programmed microprocessor, a micro-controller, a peripheral integrated circuit element, and other devices or arrangements of devices that are capable of implementing the steps that constitute the method of the present invention. In an embodiment of the present invention, the memory 306 may store software for implementing various embodiments of the present invention. The computer system 302 may have additional components. For example, the computer system 302 includes one or more communication channels 308, one or more input devices 310, one or more output devices 312, and storage 314. An interconnection mechanism (not shown) such as a bus, controller, or network, interconnects the components of the computer system 302. In various embodiments of the present invention, operating system software (not shown) provides an operating environment for various softwares executing in the computer system 302, and manages different functionalities of the components of the computer system 302.

The communication channel(s) 308 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, Bluetooth or other transmission media.

The input device(s) 310 may include, but not limited to, a keyboard, mouse, pen, joystick, trackball, a voice device, a scanning device, touch screen or any another device that is capable of providing input to the computer system 302. In an embodiment of the present invention, the input device(s) 310 may be a sound card or similar device that accepts audio input in analog or digital form. The output device(s) 312 may include, but not limited to, a user interface on CRT or LCD, printer, speaker, CD/DVD writer, or any other device that provides output from the computer system 302.

The storage 314 may include, but not limited to, magnetic disks, magnetic tapes, CD-ROMs, CD-RWs, DVDs, flash drives or any other medium which can be used to store information and can be accessed by the computer system 302. In various embodiments of the present invention, the storage 314 contains program instructions for implementing the described embodiments.

The present invention may suitably be embodied as a computer program product for use with the computer system 302. The method described herein is typically implemented as a computer program product, comprising a set of program instructions which is executed by the computer system 302 or any other similar device. The set of program instructions may be a series of computer readable codes stored on a tangible medium, such as a computer readable storage medium (storage 314), for example, diskette, CD-ROM, ROM, flash drives or hard disk, or transmittable to the computer system 302, via a modem or other interface device, over either a tangible medium, including but not limited to optical or analogue communications channel(s) 308. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as a system, a method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention.

I claim:

1. A method for providing data computation via a quantum computer to a client computing device, wherein the method is implemented by at least one processor executing program instructions stored in a memory, the method comprising:

defining, by the processor, a computational problem using a logical unit of work, based on an input request received from the client computing device, wherein the logical unit of work is dynamically generated for each of the input request;

determining, by the processor, one or more predefined machine learning codes defined in a format interpretable by the quantum computer, for processing the computational problem;

evaluating, by the processor, an optimal solution to the computational problem using the quantum computer, wherein the computational problem is encoded into a format interpretable by the quantum computer, and processed using the quantum computer based on the determined one or more predefined machine learning codes, wherein the encoded computational problem and the determined one or more machine learning codes are fed into the quantum computer for processing; and converting, by the processor, the optimal solution into a format interpretable by the client computing device for providing the optimal solution to the client computing device;

wherein the one or more predefined machine learning codes are determined based on automatic identification of a category of the computational problem, wherein the category of the computational problem is identified based on the input request using data analytics.

2. The method as claimed in claim 1, wherein the input request includes an objective, and one or more parameters associated with the objective.

3. The method as claimed in claim 2, wherein receiving the input request from the client computing device comprises authenticating a user of the client computing device, and enabling a dropdown menu for selecting the objective and the one or more parameters associated with the request.

4. The method as claimed in claim 1, wherein the computational problem is assigned a hexadecimal code, and maintained in a database for tracking execution of the computational problem and logs associated with the computational problem.

5. The method as claimed in claim 1, wherein the computational problem is schedulable for at least one of: immediate execution, repeated execution and execution at a later duration.

6. The method as claimed in claim 1, wherein the category of the computational problem includes supply chain optimization, warehouse management, delivery routing, traffic routing, weather forecasting, engineering design problems, network load balancing, processor load balancing and cellular antenna load balancing.

7. The method as claimed in claim 1, wherein the one or more predefined machine learning codes are in a format interpretable by the quantum computer.

8. The method as claimed in claim 1, wherein the computational problem is encoded into the format interpretable by the quantum computer using one or more quantum algorithms, whereby classical data of the computational problem is transformed into quantum states interpretable by the quantum computer.

9. The method as claimed in claim 1, wherein processing the encoded computational problem using the quantum computer comprises establishing a connection with the quantum computer via one or more APIs using a token generation technique; and feeding the encoded computational problem and the one or more predefined machine learning codes into the quantum computer for processing.

10. The method as claimed in claim 1, wherein a log associated with the computational problem is stored and maintained in a database, wherein the log includes at least details associated with the input request, the computational problem, the one or more predefined machine learning codes used, and the optimal solution to the computational problem.

11. A system for providing data computation, said system interfacing with a client computing device and a quantum computer, the system comprising:
a memory storing program instructions; a processor configured to execute the program instructions stored in the memory; and a quantum computation engine executed by the processor, and configured to:
define a computational problem using a logical unit of work, based on an input request received from the client computing device, wherein the logical unit of work is dynamically generated for each of the input request;
determine one or more predefined machine learning codes defined in a format interpretable by the quantum computer, for processing the computational problem;
evaluate an optimal solution to the computational problem using the quantum computer, wherein the computational problem is encoded into a format interpretable by the quantum computer, and processed using the quantum computer based on the determined one or more predefined machine learning codes, wherein the encoded computational problem and the determined one or more machine learning codes are fed into the quantum computer for processing; and
convert the optimal solution into a format interpretable by the client computing device;
wherein the one or more predefined machine learning codes are determined based on automatic identification of a category of the computational problem, wherein the category of the computational problem is identified based on the input request using data analytics.

12. The system as claimed in claim 11, wherein the input request includes an objective, and one or more parameters associated with the objective.

13. The system as claimed in claim 12, wherein the quantum computation engine comprises an interface unit executed by the processor, said interface unit configured to receive the input request from the client computing device by authenticating a user of the client computing device, and enabling a dropdown menu for selecting the objective and the one or more parameters associated with the request.

14. The system as claimed in claim 12, wherein the quantum computation engine comprises a task generation unit executed by the processor, said task generation unit configured to define the computational problem based on the objective and the one or more parameters associated with the input request using the logical unit of work.

15. The system as claimed in claim 11, wherein the quantum computation engine comprises a task scheduling unit executed by the processor, said task scheduling unit configured to schedule the computational problem for at least one of: immediate execution, repeated execution and execution at a later duration.

16. The system as claimed in claim 11, wherein the quantum computation engine comprises a task scheduling unit executed by the processor, said task scheduling unit configured to maintain a queue for executing the computational problem based on the time stamp of the input request.

17. The system as claimed in claim 11, wherein the category of the computational problem includes supply chain optimization, warehouse management, delivery routing, traffic routing, weather forecasting, engineering design problems, network load balancing, processor load balancing and cellular antenna load balancing.

18. The system as claimed in claim 11, wherein the quantum computation engine comprises a quantum processing unit executed by the processor, said quantum processing unit configured to encode the computational problem into the format interpretable by the quantum computer using one or more quantum algorithms, whereby classical data of the computational problem is transformed into quantum states interpretable by the quantum computer.

19. The system as claimed in claim 11, wherein the quantum computation engine comprises a quantum processing unit executed by the processor, said quantum processing unit configured to process the encoded computational problem using the quantum computer by establishing a connection with the quantum computer via one or more APIs using a token generation technique, and feeding the encoded computational problem and the one or more predefined machine learning codes into the quantum computer for processing.

20. The system as claimed in claim 11, wherein the quantum computation engine comprises a quantum processing unit executed by the processor, said quantum processing unit configured to store and maintain a log associated with the computational problem in a database, wherein the log includes at least details associated with the input request, the computational problem, the one or more predefined machine learning codes used, and the optimal solution to the computational problem.

21. A computer program product comprising:
- a non-transitory computer-readable medium having computer-readable program code stored thereon, the computer-readable program code comprising instructions that, when executed by a processor, cause the processor to:
- define a computational problem using a logical unit of work, based on an input request received from the client computing device, wherein the logical unit of work is dynamically generated for each of the input request;
- determine one or more predefined machine learning codes defined in a format interpretable by the quantum computer, for processing the computational problem; evaluate an optimal solution to the computational problem using a quantum computer, wherein the computational problem is encoded into a format interpretable by the quantum computer, and processed using the quantum computer based on the determined one or more predefined machine learning codes, wherein the encoded computational problem and the determined one or more machine learning codes are fed into the quantum computer for processing; and
- convert the optimal solution into a format interpretable by the client computing device.

* * * * *